Patented Nov. 21, 1950

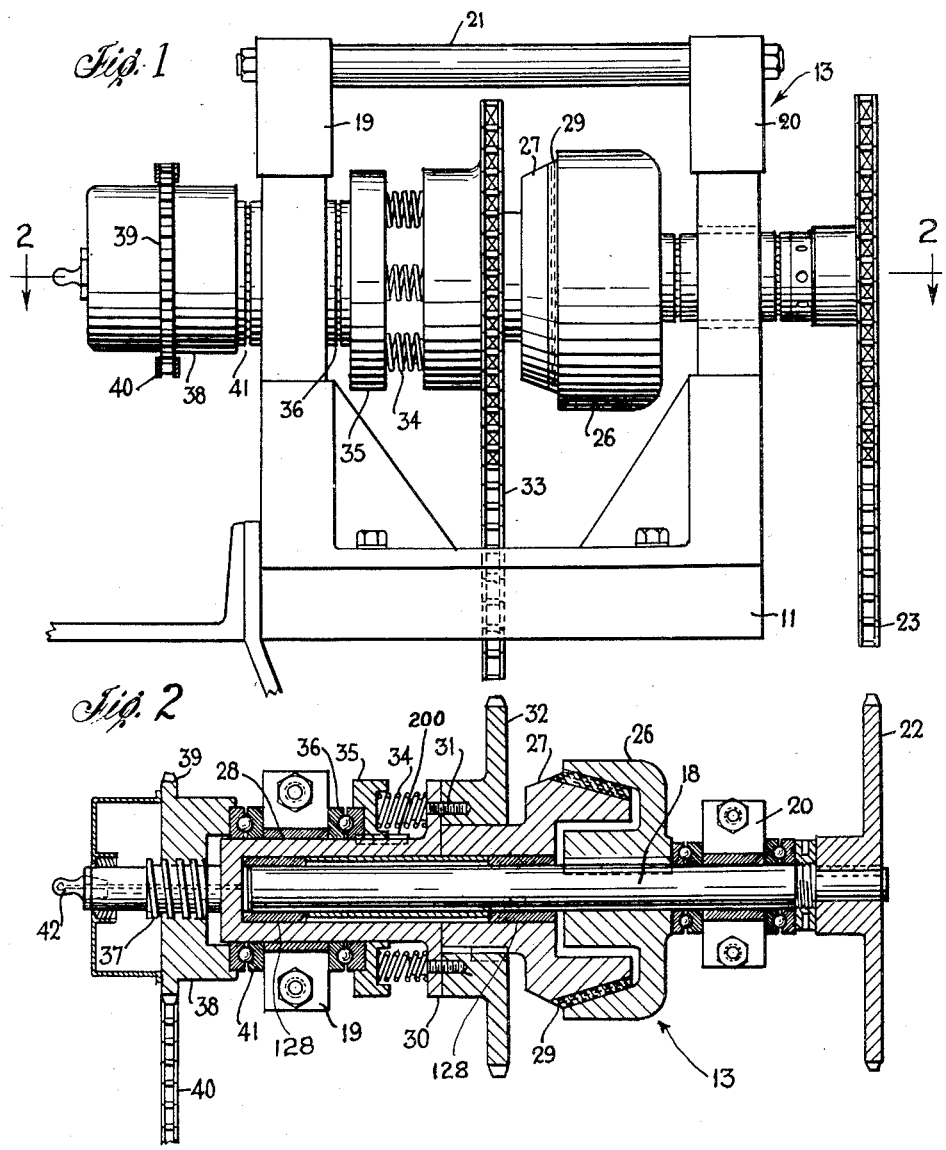

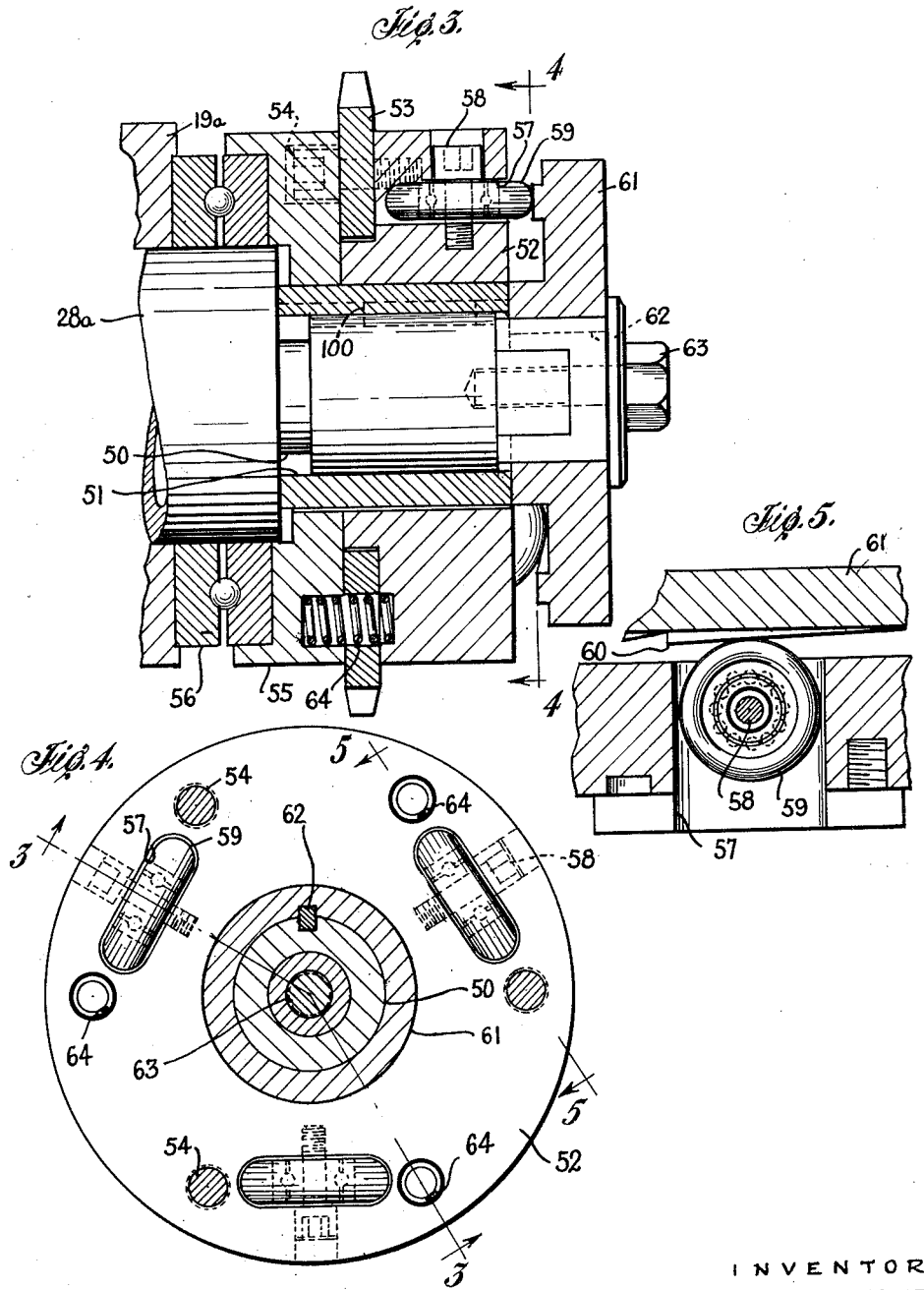

2,530,796

UNITED STATES PATENT OFFICE 2,530,796

SYNCHRONIZING DEVICE

Valone V. Weyant, Cleveland, Ohio, assignor to The Yoder Co., Cleveland, Ohio, a corporation of Ohio Application November 13, 1946, Serial No. 709,579

16 Claims. (Cl. 192—54)

This invention relates to synchronizing devices, especially to devices for synchronizing the movement of a driven member with the irregular or constant movement of a continuous, moving article such as a conveyor, a control disc, a pipe, a rod, a sheet, etc.

The general object of the present invention is to provide a completely mechanical synchronizing device that is characterized by its positive, rapid, automatic operation.

Another object of the invention is to provide an inexpensive synchronizing device which requires a minimum of maintenance.

A further object of the invention is to provide a synchronizing device which synchronizes the drive of one member with the movement of a second or control member without withdrawing energy from the second member.

Another object of the invention is to provide an uncomplicated, compact, sturdy synchronizing device for driving one member in accordance with the movement of a control member.

The foregoing, and other objects and advantages of the invention, are achieved by the provision of a drive shaft, a driven sleeve or shaft, overdrive clutch means connecting the two shafts together, and means for controlling the engagement of the clutch means to vary the slippage between the shafts, which last-named means is controlled by the movement of the control member with which the device of the invention is to synchronize the drive of a member driven therefrom.

Attention now is directed to the accompanying drawings, wherein:

Fig. 1 is an elevation of apparatus embodying the principles of my invention;

Fig. 2 is a horizontal section on line 2—2 of Fig. 1;

Fig. 3 is a section on line 3—3 of Fig. 4 and shows a modification of the clutch control of the invention;

Fig. 4 is a vertical section on line 4—4 of Fig. 3;

Fig. 5 is a fragmentary section on line 5—5 of Fig. 4; and

Figure 6:
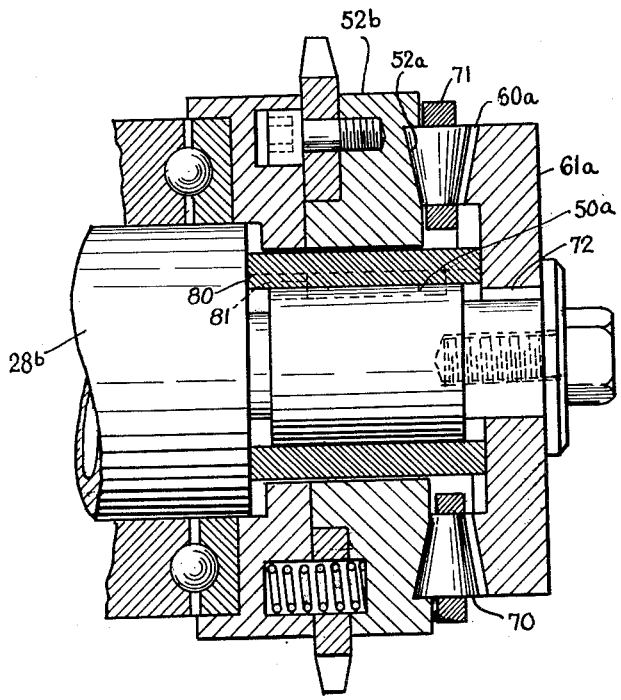
Fig. 6 is a section, similar to Fig. 3, of a further modification of a clutch control of the invention.

Reference now is made to the accompanying drawings, wherein a synchronizing device, indicated generally at 13, is shown. This device is adapted to control the movement of a member driven therefrom so that such movement agrees exactly with that of a second, or control member which is being driven by other means (not shown). To this end, a shaft 18 may be suitably journalled in a spaced pair of brackets, or housings 19 and 20 that are carried by a frame 11 and are connected at their upper ends by a tie bar 21. The housing 19 functions as a stop, as will hereinafter appear. The shaft 18 is constantly driven by means, such as a sprocket 22, suitably secured to one end thereof, which sprocket is engaged with a chain 23 that in turn engages with any desired drive means (not shown). The shaft 18 carries conventional overrunning clutch means which may include a cup section 26 of a frictional cone clutch the cone section 27 of which is suitably mounted on a sleeve 28. The sleeve 28 is carried on the shaft 18 and may be journalled thereon by bushings 128. Conventional friction material 29 is secured to one of the adjacent conical faces of the clutch sections 26 and 27. In all events, the clutch is to be adjustable by relative axial movement of its components so as to vary the slippage which occurs therein.

A primary feature of the invention is that the two elements whose movements are to be synchronized are both associated with and controlled through the clutch sections and the sleeve 28. Thus a flange 30 may be formed integrally with the sleeve 28 at the end thereof adjacent the cone clutch section 27 and cap screws 31 secure a sprocket gear 32 to this flange 30. A chain 33 may be used to connect this gear 32 to the member (not shown) to be driven and controlled by the device 13. The gear 32 and the cone clutch section 27 are constantly urged axially of the shaft 18 by resilient means, such as a plurality of coil springs 34, that bear on the flange 30. These springs 34 are backed by a disc 35 which is carried by the sleeve 28 and rotates therewith. A key 200 secures the disc 35 to the sleeve 28 but permits relative axial movement therebetween. A conventional thrust roller bearing 36, or other similar means, separates the disc 35 from the housing 19 so that the housing serves as a limit member with relation to axial movement of the clutch section 27, which is continually urged towards the cup section 26 and the housing 20.

For engagement with means controlled by the independently driven control means the movement of which is to control the synchronizing device 13, and to regulate the engagement of the clutch sections 26 and 27, the sleeve 28 may have a threaded stud 37 fixedly associated therewith and extending axially from the end thereof remote from the flanged end of same. Then control means or a connector member, such as a hub nut 38, is engaged with the stud 37 and the nut has a sprocket 39 or other conventional means formed integrally with or secured to its periphery, which sprocket 39 has a chain 40 engaged therewith. The chain 40 is used to connect the driven control member, such as a conveyor, a control disc or gear, a pipe (not shown), or the like to the synchronizing device 13 so that the movement of such driven member can control a member driven by the device 13. As shown in Fig. 2, the laterally inner edge of the nut 38 bears against a suitable thrust bearing 41 which in turn bears against the outer side of the housing 19 and is held against movement axially of the shaft 18 thereby. A grease fitting 42 is secured to the end of the stud 37 and it connects to a point within the sleeve 28 to lubricate the shaft 18. The springs 34 draw the nut 38 tightly against the outer side of the housing 19 and so changes the position of the sleeve 28, should the nut 38 be backed off the stud 37 a portion of a turn, to immediately reposition the nut back up against the bearing 41 which, in turn, is forced against the housing 19.

In operation, the shaft 18 is driven at a speed higher than that ever desired for the sleeve 28 so that there is always some over drive slip between the clutch sections. The nut 38 serves to control the axial force bringing the clutch sections into engagement by moving the sleeve 28 axially with relation to the shaft 18, and thus regulate the amount of clutch slip. While the nut 38 is free with relation to the stud 37, it still will rotate therewith and serve to transmit slight force therethrough, since the pitch of the threads is made great enough to set up sufficient friction for this purpose. As previously indicated, the gear or sprocket 39 is connected to the driven (control) member so as to indicate movement thereof. Thus the rotation of the sprocket 39 is a measurement of the motion of such driven (control) member, and if such member moves faster than the sleeve 28, the nut 38 will be rotated, with relation to the stud 37, so as to be moved axially towards the outer end of the stud. Since the nut 38 is the member limiting the axial movement of the clutch cone 27 towards the clutch cup 26 by action of the springs 34, such greater speed of the nut 38 will advance the nut on the stud and free the sleeve 28 and its associated means for axial movement towards the clutch cup 26. The springs 34 will force the clutch cone 27 more tightly into engagement with the clutch cup 26 as soon as the movement of the nut 38 frees the sleeve for such action. This will, of course, give better engagement of the clutch sections so that the clutch cone 27 and hence the sprocket 32 will be driven at a greater speed to bring them up to the speed of the driven (control) member, as the nut 38 will continue to advance on the stud 37 until the speed of rotation of the sleeve 28 and associated means is up to the speed of the control member.

Then, should the contrary be true and the speed of the sprocket 32 be greater than that of the sprocket 39, the stud 37 will be turned into the nut 38 whereby the nut will serve to draw the clutch cone 27 out of engagement with the clutch cup 26 and the speed of drive of the sleeve 28 and associated means will be automatically reduced. Hence the sprockets 32 and 39 are automatically adjusted by mechanical means alone to operate at the same angular velocity and the linear speeds of same can be adjusted to the desired relation by predetermined calculations as to their sizes with relation to the remainder of the apparatus, all to produce the desired relationship between the machines which are to be synchronized by the device of the invention.

It will be seen that this action of the stud 37 and nut 38 is very rapid and that only a very short, relative rotational movement is required to change the clutch engagement.

Figs. 3, 4 and 5 show a modified type of control means in place of the stud 37 and nut 38 to control the axial position of the sleeve 28a, that is positioned the same as the sleeve 28 of Figs. 1 and 2. In this instance, the sleeve 28a has a stud 50 engaged with and extending axially from it in place of the stud 37. The stud 50 carries a bushing 51 which in turn journals a sprocket hub, or connector member 52 thereon, which has means, such as a sprocket 53 secured thereto by a plurality of circumferentially spaced cap screws 54. This sprocket 53 is engaged in a suitable manner to the driven control member with which the device of the invention is to synchronize a second operation. A collar 55 may be placed over the axially inner end of the hub 52 and it bears on a conventional thrust bearing 56 which in turn bears against and its held against movement axially inwardly of the sleeve 28a by a housing 19a. A key 100 secures the bushing 51 to the stud 50.

Then to regulate the axial force bringing the clutch sections (not shown) into engagement, roller and cam means are provided for controlling the axial position of the sleeve 28a. A plurality of slots 57 are formed in the hub 52 and cap screws 58 journal conventional roller bearings 59 in the slots 57. The bearings 59 extend axially outwardly of the hub 52, as shown in Fig. 3, and engage with circumferentially directed and spaced arcuate cam surfaces 60 which are formed on a cam 61. This cam 61 is secured to, and rotates with, the stud 50 by means of a key 62. A cap screw 63 retains the cam and key in engagement and secures the cam to the stud.

In order to retain the rollers 59 against the cam surfaces 60, coil springs 64 may be positioned in complementary recesses formed in the hub 52 and collar 55. These recesses are equally spaced circumferentially around the hub, as shown in Fig. 4.

In operation, this modified control will function as the apparatus of Figs. 1 and 2 and will automatically effect an axially directed pull, or release of the stud 50, and thus on the sleeve 28a, in accordance with the speed of the sleeve in relation to the speed at which the sprocket 53 is driven by the control member to which it is connected. That is, if the sprocket 53 is being driven faster than the cam 61, the bearings 59 will roll towards the lower end of the cam so as to permit coil springs, like the springs 34, to push the clutch sections (not shown), like the sections 26 and 27, to move closer together and increase the speed of the sleeve 28a. If the sprocket 53 goes slower than the cam 61, the bearings 59 will roll towards the higher ends of the cams 60, which are driven at the same speed as the sleeve 28a. This action will force the cam 61 axially outwardly and will pull the friction clutch sections apart to reduce the drive of the sleeve 28a.

This roller bearing control is desirable in that the control action has very low friction. The sprocket 53 may be so connected to the control member, such as a conveyor or a moving length of pipe, that it either transmits a very small force to such member from the driven sleeve 28a, or it may withdraw a correspondingly small amount of energy therefrom. Preferably the sleeve 28a drives the sprocket 53 through the hub 52 as such hub has some friction with the sleeve and certain force is required to vary the position of the roller bearings on the cam. Hence a light pull can be taken from the sprocket 53 without preventing its rotation with the sleeve 28a.

Fig. 6 shows a construction very similar to that of Figs. 3 to 5 only in this instance cone bearings 70 are used in place of the roller bearings 59. These cone bearings 70 are suitably journalled in a cage 71 and engage with cam surfaces 60a on a cam 61a. Recesses 52a are formed at circumferentially spaced places in the hub 52b to engage the bearings 70 with the hub 52b and prevent relative rotation therebetween.

From the foregoing, it will be seen that an all mechanical, automatic, uncomplicated synchronizing device has been provided and that the objects of the invention have been achieved in the provision of apparatus as that shown herein.

The modification of Fig. 6 includes a key 72 that secures the cam 61a to the stud 59a for rotation with the sleeve 28b that can be moved along its axis by the cam surfaces 60a. A bushing 80 is secured to the stud 50a by a key 81. The cage 71 is suitably secured to the hub 52b.

In accordance with the patent statutes, an embodiment of the invention has been completely illustrated and described herein. However, the scope of the invention is broader than the specific examples thereof set forth herein and it includes modifications within the scope of the appended claims.

What is claimed is:

1. A device for synchronizing the operation of a driven member with that of a moving control member, which device comprises a driven shaft, sleeve means journalled on said driven shaft, a friction clutch member secured to said shaft, a mating clutch member secured to said sleeve member, a fixedly positioned housing for said shaft and said sleeve and with said sleeve member protruding therethrough, a disc member positioned on said sleeve adjacent said housing on the same side thereof as said clutch members, means securing said disc member to said sleeve member for relative axial movement therebetween, bearing means positioned on said sleeve member intermediate said disc member and said housing to facilitate relative rotational movement therebetween, spring means compressed between said disc member and said sleeve to urge said clutch member secured thereto into engagement with said other clutch member, means carried by said sleeve member for engaging with a member to be driven thereby, a threaded stud secured to the protruding end of said sleeve and extending axially therefrom, a gear nut threadedly engaged with said stud and adapted to engage with the control member, and a bearing positioned between said gear nut and said housing with said gear nut being held thereby against axial movement towards said housing whereby said gear nut controls the axial position of said sleeve member on said shaft and thereby the engagement of said clutch sections, said gear nut being adapted to be moved axially of said stud when said gear nut is rotating faster or slower than said sleeve whereby said spring means and stud cooperate to tighten or loosen the engagement of said clutch sections to bring said sleeve automatically to the speed of said gear nut.

2. A device for synchronizing the operation of a driven member with that of a moving control member, which device comprises a driven shaft, sleeve means journalled on said driven shaft, a clutch member secured to said shaft, a mating clutch member secured to said sleeve member, a fixedly positioned housing for said shaft and said sleeve and with said sleeve member extending completely therethrough, a disc member positioned on said sleeve adjacent said housing and secured to said sleeve member for relative axial movement, bearing means positioned on said sleeve member intermediate said disc member and said housing to facilitate relative rotational movement therebetween, resilient means compressed between said disc member and said sleeve to urge said clutch member secured thereto into engagement with said other clutch member, means carried by said sleeve member for engaging with a member to be driven thereby, a threaded stud secured to an end of said sleeve and extending axially therefrom on the opposite side of said housing as said disc member, a gear nut threadedly engaged with said stud and adapted to engage with the control member, and a bearing positioned between said gear nut and said housing to prevent axial movement of said gear nut towards said housing, said gear nut being adapted to control the axial position of said sleeve member on said shaft and thereby the engagement of said clutch sections, said gear nut being adapted to be rotated on said stud and be moved axially of said stud when said gear nut is rotating faster or slower than said sleeve whereby said sleeve is moved axially to tighten or loosen the engagement of said clutch sections to bring said sleeve automatically to the speed of said gear nut.

3. A device for synchronizing the operation of a driven member with that of a moving control member, which device comprises a driven shaft, sleeve means journalled on said driven shaft and adapted to be moved axially thereof, a clutch member secured to said shaft, a mating clutch member secured to said sleeve member, a fixedly positioned housing for said sleeve means and with said sleeve means extending completely therethrough, a disc member positioned on said sleeve means adjacent said housing, means securing said disc member to said sleeve means for relative axial movement, spring means compressed between said disc member and said sleeve means to urge said clutch member secured thereto into engagement with said other clutch member, means carried by said sleeve means for engaging with a member to be driven thereby, cam means secured to the end of said sleeve means on the opposite side of said housing as said disc member, and means engaged with said cam means and adapted to be engaged with the control member to be rotated thereby, said spring means, cam means and last named means cooperating to control the axial position of said sleeve means to tighten or loosen the engagement of said clutch sections so as to bring said sleeve means automatically to the speed of the control member.

4. In a device for synchronizing the operation of a driven member with that of a moving control member, a driven shaft, a sleeve journalled on said shaft and adapted to be moved axially thereof, a variable clutch connecting said sleeve to said shaft, the engagement of said clutch being controlled by the axially directed forces thereon, means urging said clutch into its engaging position, cam means carried by and rotatable with said sleeve, a hub member journalled on said sleeve, means for preventing axial movement of said hub member towards said clutch, bearing means carried by said hub member and engaged with said cam means for varying the axial position of said sleeve and thereby the engagement of said clutch, said bearing means functioning with variation in the relative arcuate positions of said hub member and said cam means, and gear means carried by said hub member and adapted to engage with the control member and be rotated thereby whereby said last named means will vary the relative circumferential positions of said hub member and said cam means to vary the engagement of said clutch upon differences of the speeds of rotation of said hub member and said sleeve.

5. A device for synchronizing the operation of a driven member with that of a moving control member, which device comprises a driven shaft, a sleeve journalled on said shaft, an axially adjustable clutch connecting said sleeve to said shaft, means urging said clutch into its engaging position, means carried by said sleeve to connect it to a driven member to drive it thereby, cam means carried by said sleeve for controlling the engagement of said clutch, said cam means being rotatable with relation to said shaft, and means rotatively engaged with said cam means and adapted to engage with the control member, said last named means being rotatable with relation to said cam means to vary the clutch control action thereof.

6. A device for synchronizing the operation of a driven member with that of a moving control member, which device comprises a driven shaft, sleeve means journalled on said shaft, a clutch connecting said sleeve means to said shaft, resilient means urging said clutch into engagement, means carried by said sleeve means for connecting it to a member to drive it thereby, and cam means secured to said sleeve means for controlling the axial position of said sleeve means and hence the engagement of said clutch, said cam means being adapted to be engaged with the control member and to automatically set said clutch in cooperation with said resilient means to drive said sleeve means at the angular velocity of the control member.

7. A device as in claim 6 wherein said cam means include a cam device secured to said sleeve means, and a second cam portion is rotatably carried by said cam device and maintained in a position against axial movement with relation to the synchronizer device, said second cam portion being rotatable and engaged with the control member whereby the relative axial position of said sleeve means on said shaft and the speed of rotation of said sleeve means are dependent upon the relative arcuate positions of said cam device and said second cam portion.

8. A device for synchronizing the movement of a driven member with that of a moving control member without withdrawing driving energy from the control member, which device comprises a driven shaft, a sleeve journalled on said shaft, clutch means connecting said sleeve to said shaft for driving said sleeve, the driving engagement of said clutch means being controlled by the forces exerted thereon axially of said sleeve, a housing receiving said sleeve and fixedly secured against axial movement, springs positioned between a member bearing on said housing and a portion of said sleeve for urging said sleeve towards said clutch means for engaging same, a connector member rotatively carried by said sleeve, a gear device carried by said connector member for engagement with a control member to be rotated thereby, said connector member bearing on said housing on the opposite side of same as said springs, and cam means connecting said sleeve to said connector member and adapted to co-operate with said springs to move said sleeve axially of said driven shaft dependent upon the relative speeds of said connector member and said sleeve to control the engagement of said clutch means and thereby the speed of rotation of said sleeve.

9. A device for synchronizing the movement of a driven member with that of a moving control member without withdrawing driving energy from the control member, which device comprises a driven shaft, a sleeve journalled on said shaft and freely rotatable with relation thereto, a slip clutch connecting said sleeve to said shaft for driving said sleeve, the driving engagement of said clutch being controlled by the forces exerted thereon axially of said sleeve, a stop positioned adjacent said sleeve and fixedly secured against axial movement, springs positioned between said stop and said sleeve for urging said sleeve towards said clutch for engaging same, a connector member rotatively carried by said sleeve, said connector member being adapted to engage with a control member to be rotated thereby by withdrawal of a minimum of energy therefrom, said connector member bearing on said stop on the opposite side of same as said springs, and cam means connecting said sleeve to said connector member and adapted to co-operate with said springs to move said sleeve axially of said driven shaft in either direction dependent upon the relative speeds of said connector member and said sleeve to control the engagement of said clutch and thereby the speed of rotation of said sleeve and bring said sleeve to the speed of said connector member.

10. A device as in claim 9 wherein said cam means include a shaft portion secured to said sleeve on the same side of said stop as said connector member, a cam disc secured to said shaft portion and extending normally therefrom, a plurality of cam rollers, a cage in which said cam rollers are secured to said sleeve journally, said cam rollers being positioned between and engaged with said connector member and said cam disc for controlling the relative axial position of said sleeve on said shaft dependent upon the relative arcuate positions of said sleeve and said connector member.

11. A device as in claim 8 wherein said cam means include a shaft portion secured to said sleeve adjacent said connector member, a cam disc secured to said shaft portion and extending normally therefrom, and a plurality of cam rollers journalled on said connector member and engaged with said cam disc for controlling with said springs the relative axial position of said sleeve on said shaft dependent upon the relative arcuate positions of said sleeve and said connector member.

12. In a machine for engaging with a continuous article and operating in synchronism with movement of such article, chain means engaged with a control member driven thereby, a nut engaged with said chain means, a threaded stud engaged with and carrying said nut for limited axial movement, a driven member, said stud being carried by said driven member to supply driving force thereto through said nut, the pitch of the threads on said stud being sufficiently great to transmit limited forces therethrough without relative movement of said nut on said stud, and means for setting up an axially directed force on said nut.

13. A device for synchronizing the operation of a driven member with that of a moving control member, which device comprises a driven shaft, a sleeve journalled on said shaft, an over drive clutch connecting said sleeve to said shaft with the driving engagement of the clutch being controlled by the axially directed forces thereon, means urging said clutch into engaging position, means carried by said sleeve to connect it to a controlled member to drive it thereby, cam means carried by said sleeve for controlling the engagement of said clutch by control of the axial position of said sleeve, and means rotatively engaged with said cam means and engaged with the control member to be rotated thereby, said last named means being journalled on said sleeve, said last named means being retained against movement axially of the device, said cam means being free for axial movement whereby if said last named means varies its relative circumferential position on said cam means said sleeve will be moved axially to vary the engagement of said clutch and synchronize said sleeve and last named means.

14. A device for synchronizing the operation of a driven member with that of a moving control member, which device comprises a driven shaft, a sleeve journalled on said shaft, an over drive clutch connecting said sleeve to said shaft with the driving engagement of the clutch being controlled by the axially directed forces thereon, means urging said clutch into engaging position, means carried by said sleeve to connect it to a controlled member to drive it thereby, cam means carried by said sleeve for controlling the engagement of said clutch by control of the axial position of said sleeve, and means rotatively engaged with said cam means and engaged with the control member to be rotated thereby, said last named means being carried by and movable arcuately with relation to said sleeve, said last named means being retained against movement axially of the device, said cam means being free for axial movement whereby if said last named means varies its relative circumferential position on said cam means said sleeve will be moved axially to vary the engagement of said clutch and synchronize said sleeve and last named means.

15. A device for synchronizing the operation of a driven member with that of a moving control member, which device comprises a driven shaft, a sleeve journalled on said shaft, clutch means connecting said sleeve to said shaft for rotation at speeds less than that of said shaft, the driving engagement of said clutch means being controlled by the axially directed forces thereon, spring means urging said clutch into its engaging position, sprocket means carried by said sleeve for connecting it to a member to drive it thereby, cam means connecting to said sleeve for resisting the action of said spring means and cooperating therewith to control the engagement of said clutch, and cam follower means rotatively engaged with said cam means and adapted to engage with the control member for rotation in accordance with movement thereof, at least one of said cam means and said cam follower means being retained against movement axially of said sleeve and with the other of said parts being free for such axial movement so that when said cam follower means varies its relative circumferential position on said cam means in accordance with the relative circumferential speeds thereof the engagement of said clutch means is adjusted to have said sleeve and said cam follower means rotate at the same speed.

16. In a machine for engaging with a continuous article and operating in synchronism with movement of such article, a gear connector member adapted to be engaged with a continuous control member to be driven thereby, a sleeve on which said connector member is journalled, a cam, a cam follower, one of said cam and cam follower being secured to and carried by said sleeve and the other by said connector member, the pitch of said cam being sufficient to transmit limited forces therethrough without relative movement of said cam and cam follower, means for driving said sleeve and controlled by the axial position of said sleeve, and means for urging the sleeve in one direction, said cam and cam follower cooperating to control the position of said sleeve against the action of said last named means.

VALONE V. WEYANT.

REFERENCES CITED

The following references are of record in the file of this patent:

UNITED STATES PATENTS

| Number | Name | Date |
|---|---|---|
| 528,274 | Martin | Oct. 30, 1894 |
| 584,301 | Baxter | June 8, 1897 |
| 1,105,165 | Sturgeon | July 28, 1914 |
| 1,235,940 | Shipman | Aug. 7, 1917 |
| 1,376,033 | Page | Apr. 26, 1921 |
| 2,038,182 | Linder | Apr. 26, 1936 |
| 2,061,787 | Warner | Nov. 24, 1936 |
| 2,123,744 | Ramsey | July 12, 1938 |

FOREIGN PATENTS

| Number | Country | Date |
|---|---|---|
| 8,255 | Australia | July 10, 1902 |